United States Patent
Lee

(10) Patent No.: US 7,496,741 B2
(45) Date of Patent: Feb. 24, 2009

(54) SYSTEM AND METHOD FOR RECONFIGURING A REAL TIME CLOCK TIME OF A COMPUTER

(75) Inventor: Ming-Lung Lee, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 287 days.

(21) Appl. No.: 11/309,653

(22) Filed: Sep. 6, 2006

(65) Prior Publication Data

US 2007/0113068 A1    May 17, 2007

(30) Foreign Application Priority Data

Nov. 15, 2005    (CN) .................. 2005 1 0101507

(51) Int. Cl.
G06F 9/00    (2006.01)
(52) U.S. Cl. ...................... 713/1; 713/100; 713/500
(58) Field of Classification Search .............. 713/1
See application file for complete search history.

(56) References Cited

U.S. PATENT DOCUMENTS 4,907,255 A * 3/1990 Kurokawa ............. 379/100.11
6,408,397 B1    6/2002 Alexander et al.
6,898,492 B2 * 5/2005 de Leon et al. ............... 701/35
7,266,714 B2 * 9/2007 Davies et al. ................ 713/500
2003/0233553 A1 * 12/2003 Parks et al. .................. 713/178

FOREIGN PATENT DOCUMENTS

JP    02071190 A  *  3/1990
TW    515958         1/2003

* cited by examiner

Primary Examiner—Suresh K Suryawanshi
(74) Attorney, Agent, or Firm—Winston Hsu

(57) ABSTRACT

A method for reconfiguring an RTC time of a computer is disclosed. The method includes the steps of: storing an initial real time clock (RTC) time when the computer is powered on; calculating a first elapsed time tracked from the initial RTC time and a second elapsed time tracked from the initial RTC time; reading an RTC time of the computer after a time span of the first elapsed time; detecting whether the RTC time equals the sum of the initial RTC time and the first elapsed time; and adjusting a current RTC time of the computer after a time span of the second elapsed time to the sum of the initial RTC time and the second elapsed time, if the RTC time doesn't equal to the sum of the initial RTC time and the first elapsed time. A related system is also disclosed.

6 Claims, 3 Drawing Sheets

SYSTEM AND METHOD FOR RECONFIGURING A REAL TIME CLOCK TIME OF A COMPUTER

FIELD OF THE INVENTION

The present invention generally relates to systems and methods for reconfiguring system settings of computers, and more particularly to a system and method for reconfiguring a real time clock time of a computer.

DESCRIPTION OF RELATED ART

An operating system may include a system clock to provide a system time for measuring small increments of time (e.g. 1 millisecond increments). The operating system may update the system clock in response to a periodic interrupt generated by a system such as an Intel 8254 event timer, an Intel High Performance Event Timer (HPET), or a real time clock event timer. The operating system may reference the system time to time-stamp files, to generate periodic interrupts, to generate time-based one-shot interrupts, to schedule processes, etc. Generally, the system clock may maintain a system time while a computing device is in an operating state, but it is typically unable to maintain the system time once the computing device is powered off or in a sleep state. Therefore, the operating system may use a reference clock to initialize the system time of the system clock at system start-up and at system wake-up. However, the system clock tends to drift away from the correct time. Accordingly, the operating system may use the reference clock to periodically update the system time of the system clock.

One such reference clock is a hardware real time clock (RTC). A computing device typically includes an RTC and a battery to power the RTC when the computing device is powered down. Due to the battery power, the RTC is able to maintain a real time even when the computing device is powered off or in a sleep state, and generally is capable of keeping the RTC time more accurately than the system clock. The RTC provides an interface such as, for example, one or more registers that may be used to set or change the RTC time.

However, the RTC time may drift away from the correct time or be lost because of the reasons of users' abnormal adjustment or other factors. One example is that the RTC time may be lost when the operating system updates the system time of the system clock, and another example is that there is a drift value between the RTC time and the system clock. The lost or inaccuracy of the RTC time would bring too much inconvenience to users.

Therefore, what is needed is a system and method for reconfiguring an RTC time of a computer, which can automatically reconfiguring the RTC time of the computer by reconfiguring an accurate time for the computer in security.

SUMMARY OF INVENTION

One embodiment of the present invention provides a system for reconfiguring a real time clock time of a computer. The system is stored in a basic input/output system (BIOS) that is connected with a complementary metal-oxide-semiconductor transistor random access memory (CMOS RAM). The system includes: a storing module for storing an initial real time clock (RTC) time from the CMOS RAM into the BIOS when the computer is powered on; a calculating module for calculating a first elapsed time tracked from the initial RTC time and a second elapsed time tracked from the initial RTC time; a reading module for reading an RTC time of the computer after a time span of the first elapsed time; a detecting module for detecting whether the RTC time equals the sum of the initial RTC time and the first elapsed time; and an adjusting module for adjusting a current RTC time of the computer after a time span of the second elapsed time to the sum of the initial RTC time and the second elapsed time.

Another embodiment provides a method for reconfiguring a real time clock time of a computer. The method includes the steps of: (a) storing an initial real time clock time from a complementary metal-oxide-semiconductor transistor random access memory (CMOS RAM) into a Basic Input/Output System (BIOS) when the computer is powered on; (b) calculating a first elapsed time tracked from the initial RTC time and a second elapsed time tracked from the initial RTC time; (c) reading an RTC time of the computer after a time span of the first elapsed time; (d) detecting whether the RTC time equals the sum of the initial RTC time and the first elapsed time; and (e) adjusting a current RTC time of the computer after a time span of the second elapsed time to the sum of the initial RTC time and the second elapsed time, if the RTC time doesn't equal to the sum of the initial RTC time and the first elapsed time.

Other objects, advantages and novel features of the embodiments will be drawn from the following detailed description together with the attached drawings, in which:

DETAILED DESCRIPTION

Figure 1:
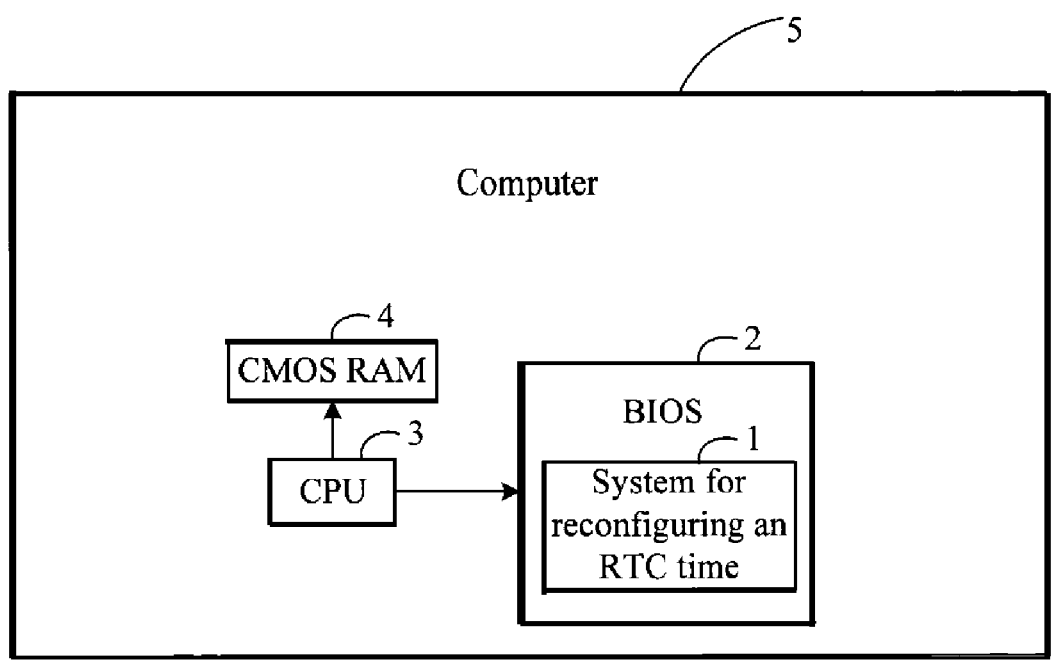
FIG. 1 is a schematic diagram of a hardware configuration and application environment of a system for reconfiguring a real time clock time of a computer in accordance with a preferred embodiment.

FIG. 1 is a schematic diagram of a hardware configuration and application environment of a system for reconfiguring a real time clock time of a computer (hereinafter, "the system"), in accordance with a preferred embodiment. In the preferred embodiment, the system 1 is stored in a basic input/output system (BIOS) 2 of a computer 5. The BIOS 2 can be invoked and executed by a central processing unit (CPU) 3 in the computer 5. The computer 5 further includes a complementary metal-oxide-semiconductor transistor random access memory (CMOS RAM) 4 that is connected with the CPU 3.

A real time clock (RTC) is a battery-powered clock that is included in the CMOS RAM 4. The CMOS RAM 4 is usually separated from the microprocessor of the computer 5 and other hardware chips. The CMOS RAM 4 stores system descriptions or system setting values that include current time values stored by the real time clock. The time values are for the year, month, date, hours, minutes, and seconds. The RTC keeps track of time even when the computer 5 is off, because the RTC runs on a separate battery that is not connected to the normal power supply of the computer 5. When the computer 5 is turned on, the BIOS 2 that is stored in a read-only memory (ROM) microchip of the computer 5 reads the current RTC time from the CMOS RAM 4 with the RTC.

The CPU 3 has a time stamp that is a digital seal of a document that includes a time indication. The time stamp is used to record clock cycles after the CPU 3 has been powered on. The clock cycles have a transformational relation with a dominant frequency of the CPU 3. Therefore, when the CPU 3 is powered on, an elapsed time can be calculated based on the dominant frequency records of the CPU 3.

Figure 2:
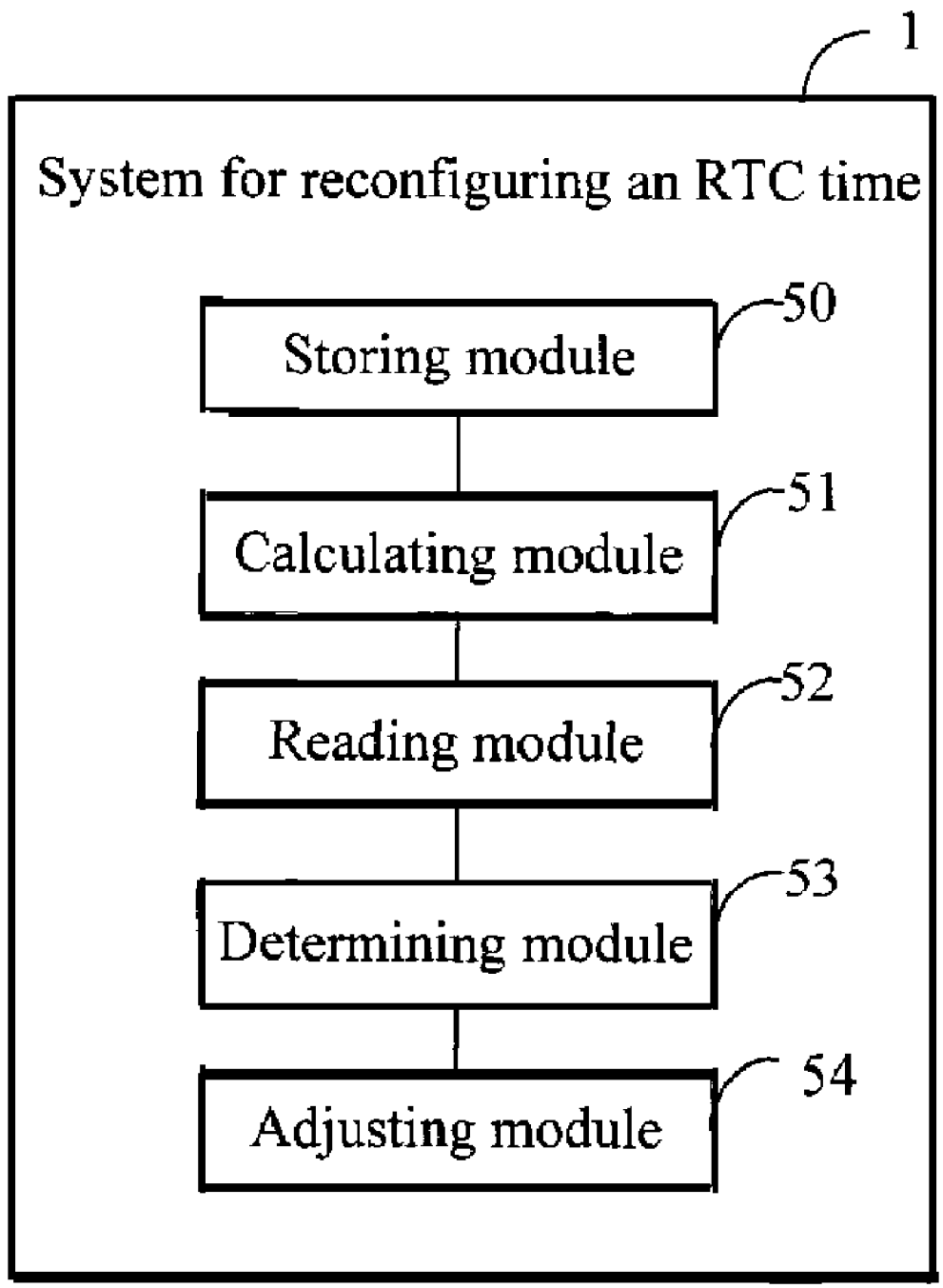
FIG. 2 is a schematic diagram of main function modules of the system for reconfiguring the RTC time of the computer of FIG. 1.

FIG. 2 is a schematic diagram of main function modules of the system 1 for reconfiguring the RTC time of the computer of FIG. 1. The system 1 includes a storing module 50, a calculating module 51, a reading module 52, a detecting module 53, and an adjusting module 54.

The storing module 50 is used for storing an initial RTC time recorded in the CMOS RAM 4 into the BIOS 2 when the computer 5 is powered on. The initial RTC time is an accurate time that is used as a benchmark for reconfiguring the RTC time of the computer 5 when the RTC time has errors.

The calculating module 51 is used for calculating a first elapsed time tracked from the initial RTC time by utilizing the clock cycles recorded by the time stamp in the CPU 3, and calculating a second elapsed time tracked from the initial RTC time. The first elapsed time is used for testing whether the RTC time of the computer is correct and the second elapsed time is used for adjusting the RTC time of the computer 5 when the RTC time is not correct.

The reading module 52 is used for reading an RTC time of the computer 5 from the CMOS RAM 4 after a time span of the first elapsed time. The RTC time should equal to the sum of the initial RTC time and the first elapsed time, if the RTC time is correct.

The detecting module 53 is used for detecting whether the RTC time of the computer 5 is correct, and detecting whether there are any time recovery requests from users when the RTC time is not correct. If the RTC time equals the sum of the initial RTC time and the first elapsed time, it indicates that the RTC time of the computer 5 is correct.

The adjusting module 54 is used for adjusting a current RTC time after a time span of the second elapsed time to the sum of the initial RTC time and the second elapsed time if the RTC time of the computer 5 is not correct.

Figure 3:
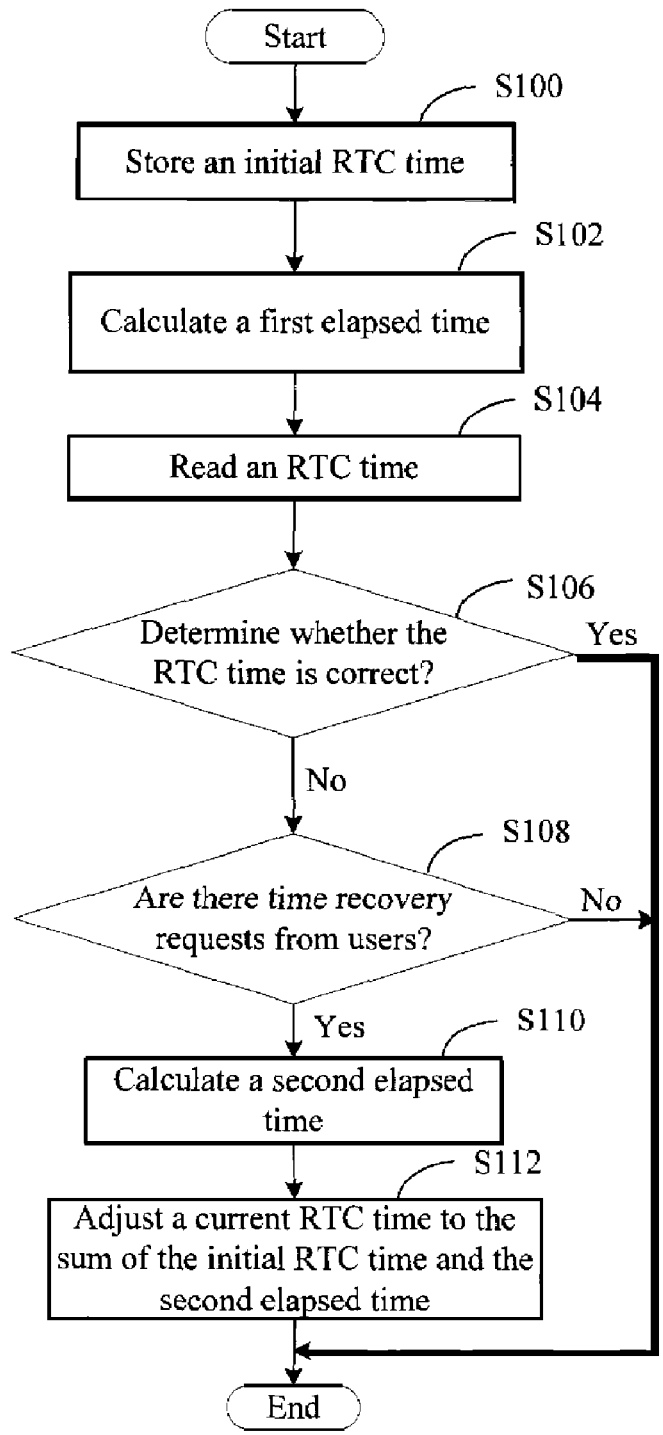
FIG. 3 is a flow chart of a method for reconfiguring a real time clock time of a computer by utilizing the system of FIG. 1.

FIG. 3 is a flow chart of a method for reconfiguring the real time clock time of the computer by implementing the system 1 as described above. In step S100, the storing module 50 saves the initial RTC time recorded in the CMOS RAM 4 into the BIOS 2. The initial RTC time is the accurate time that is used as the benchmark for reconfiguring the RTC time when the RTC time of the computer 5 has errors.

In step S102, the calculating module 51 calculates the first elapsed time tracked from the initial RTC time by utilizing the clock cycles recorded by the time stamp in the CPU 3. The clock cycles have a transformational relation with the dominant frequency of the CPU 3. Therefore, the first elapsed time can be calculated according to the dominant frequency of the CPU 3.

In step S104, the reading module 52 reads the RTC time of the computer 5 from the CMOS RAM 4. If the RTC time of the computer 5 is correct, the RTC time should equal to the sum of the initial RTC time and the first elapsed time.

In step S106, the detecting module 53 detects whether the RTC time equals the sum of the initial RTC time and the first elapsed time. If the RTC time equals the sum of the initial RTC time and the first elapsed time, it indicates that the RTC time is correct, the procedure ends.

Otherwise, if the RTC time does not equal the sum of the initial RTC time and the first elapsed time, it indicates the RTC time has errors, and in step S108, the detecting module 53 further detects whether there are time recovery requests from users. If there are no time recovery requests, the procedure ends.

Otherwise, if there are time recovery requests, in step S110, the calculating module 51 calculates the second elapsed time tracked from the initial RTC time. The second elapsed time is used for adjusting the RTC time of the computer 5 when the RTC time is not correct. In step S112, the adjusting module 54 adjusts a current RTC time of the computer 5 after a time span of the second elapsed time to the sum of the initial RTC time and the second elapsed time.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for reconfiguring a real time clock time of a computer, the system being stored in a basic input/output system (BIOS) that is connected with a complementary metal-oxide-semiconductor transistor random access memory (CMOS RAM), the system comprising:

a storing module for storing an initial real time clock (RTC) time from the CMOS RAM into the BIOS when the computer is powered on;

a calculating module for calculating a first elapsed time tracked from the initial RTC time and a second elapsed time tracked from the initial RTC time;

a reading module for reading a first RTC time of the computer after a first time span of the first elapsed time;

a detecting module for detecting whether the first RTC time equals the sum of the initial RTC time and the first elapsed time for determining whether the first RTC time has errors; and an adjusting module for adjusting a second RTC time of the computer after a second time span of the second elapsed time to the sum of the initial RTC time and the second elapsed time, upon the condition that the first RTC time has errors and a time recovery request is received.

2. The system according to claim 1, wherein the first elapsed time is calculated according to clock cycles recorded by a time stamp in a central processing unit (CPU) of the computer.

3. The system according to claim 1, wherein the second elapsed time is calculated according to clock cycles recorded by a time stamp in a central processing unit (CPU) of the computer.

4. The system according to claim 1, wherein the detecting module is further used for detecting whether there are time recovering requests from users.

5. A method for reconfiguring a real time clock time of a computer, the method comprising the steps of:

storing an initial real time clock (RTC) time from a complementary metal-oxide-semiconductor transistor random access memory (CMOS RAM) into a basic input/output system (BIOS) when the computer is powered on;

calculating a first elapsed time tracked from the initial RTC time and a second elapsed time tracked from the initial RTC time;

reading a first RTC time of the computer after a first time span of the first elapsed time;

detecting whether the first RTC time is equal to the sum of the initial RTC time and the first elapsed time for determining whether the first RTC time has errors; and adjusting a second RTC time of the computer after a second time span of the second elapsed time to the sum of the initial RTC time and the second elapsed time, upon the condition that the first RTC time has errors and a time recovery request is received.

6. The method according to claim 5, wherein the initial RTC time is an accurate time that is used as a benchmark for reconfiguring the RTC time of the computer when the RTC has errors.

* * * * *